May 11, 1954
A. M. MacCALLUM
2,678,178
ALTITUDE CONTROL DEVICE FOR AIRCRAFT
Filed June 23, 1950
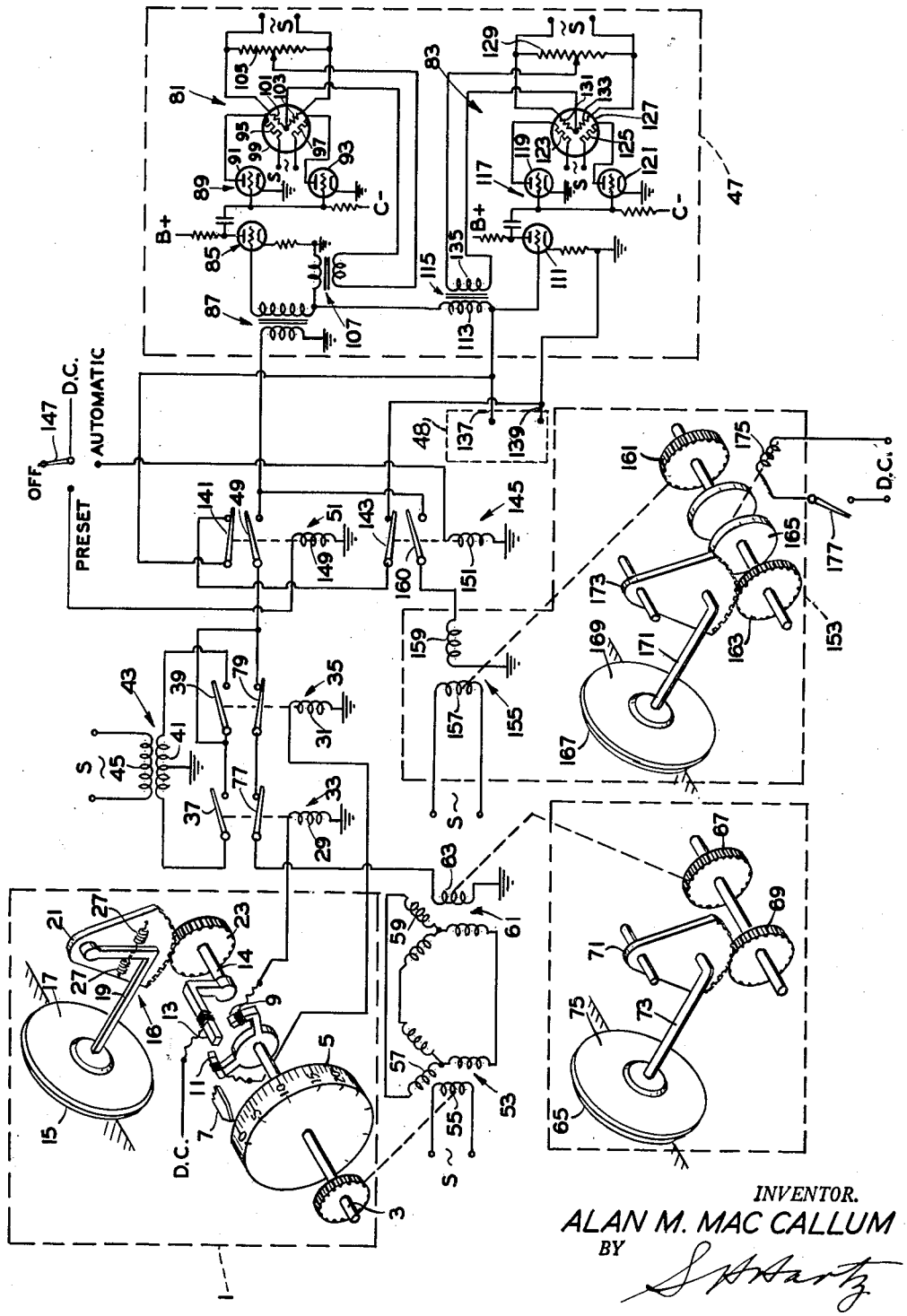
INVENTOR.
ALAN M. MAC CALLUM
BY
*S. H. Hartz*
ATTORNEY Patented May 11, 1954

2,678,178

UNITED STATES PATENT OFFICE 2,678,178

ALTITUDE CONTROL DEVICE FOR AIRCRAFT

Alan M. MacCallum, Maywood, N. J., assignor to Bendix Aviation Corporation, Teterboro, N. J., a corporation of Delaware Application June 23, 1950, Serial No. 169,927

15 Claims. (Cl. 244—77)

The present invention relates generally to automatic steering systems for aircraft, and more particularly to altitude control devices therefor.

One object of the invention is to provide a novel altitude control device wherein a predetermined altitude may be selected and the device automatically brings the craft to the selected altitude and thereafter maintains the craft at the selected altitude.

Another object is to automatically change the altitude at which the craft is flying.

Another object is to fly the craft at random altitudes and automatically maintain the craft at the altitude at which it is flying.

Another object is to accurately maintain the craft at a selected altitude with only slight deviations therefrom.

The invention contemplates a novel altitude control device for aircraft adapted for use with an automatic pilot and including first altitude responsive means adjustable to a preselected altitude at which the craft is to fly to provide signals for the automatic pilot to bring the craft approximately to the selected altitude. When the craft is flying approximately at the selected altitude, second altitude responsive means provide signals for the automatic pilot to bring the craft accurately to, and maintain the craft at, the selected altitude. The first means may include a switching arrangement for connecting opposite phases of a signal source of constant amplitude to the automatic pilot, and the second means may include transmitter and receiver inductive devices providing error signals for the automatic pilot.

The device may include altitude responsive means which provides signals for the automatic pilot to automatically maintain the craft at the altitude at which the craft is flying without adjusting the means to a preselected altitude. The device may include a data smoothing network connecting the signal means to the automatic pilot to smooth out differences in amplitude as control of the craft is shifted from one signal means to another.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

The single figure of the drawing is a schematic diagram of a novel altitude control device constructed according to the invention.

Referring now to the drawing for a more detailed description of the novel altitude control device of the present invention, the device is shown as including an altitude selector switch 1 having a rotating shaft 3 mounting a dial 5 calibrated in feet corresponding to altitude and readable against a fixed index 7. A pair of spaced contacts 9, 11 are fixed to shaft 3 and cooperate with a movable contact 13 fixed to a shaft 14 and controlled by an aneroid barometer 15 through a lost motion device 16. Barometer 15 has a movable diaphragm 17 attached to a lever 19 pivoted to a sector gear 21. Gear 21 meshes with a gear 23 fixed to shaft 14. A pair of springs 27 attached to lever 19 and to sector gear 21 tend to center the sector gear relative to the lever and accommodate lost motion between diaphragm 17 and contact 13.

Contact 13 is connected to one terminal of a direct current source and contacts 9, 11 are connected to windings 29, 31 of relays 33, 35, respectively. Relays 33, 35 have normally open contacts 37, 39 connected in series with a grounded center-tapped secondary 41 of a transformer 43 having its primary 45 connected to an alternating current source S. A data smoothing network 47, which may be of the kind shown and described in co-pending application Serial No. 168,776, filed June 17, 1950, and assigned to a common assignee, and described in detail hereinafter, is connected through a contact 49 of a relay 51 to a point between contacts 37, 39. The output of data smoothing network 47 is applied to the input of an automatic pilot 48 which may be of the kind shown and described in co-pending application Serial No. 660,343, filed April 8, 1946, and assigned to a common assignee.

When contact 13 engages contact 9, relay winding 29 is energized and closes contacts 37 to apply a uniform signal to the data smoothing circuit. When contact 13 engages contact 11, relay winding 31 is energized and closes contact 39 to apply a uniform signal to the data smoothing circuit one hundred eighty degrees out of phase with the signal provided by closing contact 37.

When the craft attains approximately the selected altitude in response to a signal provided by engagement of contact 13 with the associated contact 9 or 11, contact 13 will be moved by diaphragm 17 out of engagement with the associated contact.

A transmitter inductive device 53 has a single phase rotor 55 drivingly connected through reduction gearing (not shown) to shaft 3 and is electrically connected to alternating current source S. The reduction gearing is of such nature that when shaft 3 rotates between its limits (approximately two hundred seventy degrees) rotor 55 makes approximately three revolutions.

Transmitter 53 has a Y-connected three-phase stator 57 connected to the Y-connected three-phase stator 59 of a receiver or follow-up inductive device 61. The rotor 63 of receiver 61 is controlled by an aneroid barometer 65 through gears 67, 69 and a sector gear 71 connected by an arm 73 to the diaphragm 75 of barometer 65. Rotor 63 is connected through normally closed contacts 77, 79 of relays 33 and 35, respectively, and through contact 49 of relay 51 to data smoothing network 47. The error signal from transmitter 53 and receiver 61 is applied to the data smoothing network when contact 13 is disengaged from contacts 9, 11. The craft assumes an altitude at which receiver rotor 63 is moved by aneroid barometer 65 to null position relative to transmitter 53. Any departure of the craft from the selected altitude causes rotor 63 to move from null relative to transmitter 53 and provide an error signal to data smoothing network 47.

As indicated above, aneroid barometer 15, through contacts 9, 11, 13, provides signals which bring the craft approximately to the selected altitude, and then, aneroid barometer 65, through transmitter 53 and receiver 61, provides signals to bring the craft accurately to the selected altitude. The transmitter and receiver then function to accurately maintain the craft at the selected altitude.

Data smoothing network 47 includes a filter circuit 81, with a relatively long time constant to integrate the signal, and a phase advancing or rate circuit 83, with a time constant preferably greater than the time constant of the filter circuit so that the resulting signal leads the input signal from the altitude sensitive device.

The input signal is fed to an amplifier 85 through an input transformer 87, and the phase of the amplified signal is discriminated against the phase of a reference voltage by discriminator 89 having a pair of triodes 91, 93. The output of the discriminator is applied to heaters 95, 97 of a time delay tube 99, which may be of the kind shown and described in U. S. Patent No. 2,463,805, issued March 8, 1949, and assigned to a common assignee. The output of tube 99 is applied to a bridge circuit including a center-tapped resistor 105 and resistors 101, 103 of tube 99 in heat-exchanging relation with heaters 95, 97. The output of tube 99, as determined by unbalancing of the associated bridge circuit, is fed back to the input of amplifier 85 through a feed-back transformer 107. Heaters 95, 97 and center-tapped resistor 105 are connected to alternating current supply S. Time delay tube 99 may have any desired time constant to filter out undesirable voltages of predetermined frequencies.

The integrated signal from feed-back transformer 107 is applied to an amplifier 111 of rate circuit 83 through the secondary 113 of a feed-back transformer 115. The phase of the amplified integrated signal is discriminated against the phase of a reference voltage by discriminator 117 including triodes 119, 121. The output of the discriminator is applied to heaters 123, 125 of a time delay tube 127 of the kind shown and described in Patent No. 2,463,805 and having a time constant greater than the time constant of time delay tube 99. The output of time delay tube 127, as determined by unbalance of the bridge circuit including center-tapped resistor 129 and resistors 131, 133 of time delay tube 127, is impressed on the primary 135 of feed-back transformer 115. The integrated phase advanced signal across the input of amplifier 111 may be applied through leads 137, 139 to the elevator control of automatic pilot 48, as shown and described in application Serial No. 660,343 mentioned above.

The output of data smoothing network 47 from leads 137, 139 may be short-circuited through normally closed contact 141 of relay 51 and normally closed contact 143 of a relay 145 when a selector switch 147 is moved to "off" position to avoid interference by the automatic altitude control when the craft is flown manually. Switch 147 is connected to the direct current source and in series with winding 149 of relay 51 and in series with winding 151 of relay 145. Winding 149 is energized when switch 147 is moved to preset position and winding 151 is energized when switch 147 is moved to automatic position to open associated contacts 141 or 143 so that the output of data smoothing network 47 may be effectively applied to the automatic pilot.

If it is desired to fly the craft at 20,000 feet, for example, when the craft is on the ground or flying at a lower altitude, dial 5 is rotated until the corresponding calibration is positioned adjacent index 7 and switch 147 is moved to preset position. Winding 149 of relay 51 is energized and contact 49 is closed and contact 141 is opened. Contacts 9 and 13 close upon adjustment of dial 5, whereupon winding 29 of relay 33 is energized and opens contact 77 and closes contact 37 to connect one phase of alternating power source S to the input transformer 87 of data smoothing network 47. When the craft attains an altitude of approximately 20,000 feet, contact 13 is disengaged from contact 9 by aneroid barometer 15, whereupon winding 29 of relay 33 is de-energized and contact 37 opens to disconnect the constant signal voltage from the data smoothing network 47 and contact 77 closes to connect the error signal from receiver 61 and transmitter 53 to the input of data smoothing network 47. The data smoothing network smooths out differences in amplitude between the constant signal and the error signal as control of the craft is transferred from aneroid barometer 15 through contacts 9, 13 to aneroid barometer 65 through transmitter 53 and receiver 61 so that no violent maneuver signal is applied to the automatic pilot. When the craft attains an altitude of 20,000 feet, the transmitter and receiver are at null and the craft is accurately maintained at this altitude by aneroid barometer 65. Barometer 65 responds to small departures from the selected altitude and rotates rotor 63 of receiver 61 to provide error signals for the automatic pilot to maintain the craft at the selected altitude.

If, after attaining an altitude of 20,000 feet, it is desired to fly the craft at some lower altitude—10,000 feet, for example—dial 5 is rotated in a clockwise direction until the corresponding calibration is adjacent index 7. Contacts 11 and 13 close and winding 31 of relay 35 is energized, whereupon contact 79 is opened and contact 39 is closed to connect the opposite phase from alternating current source S to the input of data smoothing network 47. The craft will descend until it attains an altitude of approximately 10,000 feet, whereupon contact 13 is disengaged from contact 11 by aneroid barometer 15. Winding 31 of relay 35 is de-energized and contact 39 is opened to disconnect the constant signal source from the data smoothing network and contact 79 is closed to connect the error signal from transmitter 53 and receiver 61 to the input of the data smoothing network. When the craft attains an altitude of 10,000 feet, rotor 63 of receiver 61 is moved by aneroid barometer 65 to null and the craft continues to fly accurately at this altitude. As described above, aneroid barometer 65 responds to small departures from the selected altitude and moves rotor 63 from null position and the resulting error signal is fed through the data smoothing network 47 to the automatic pilot to return the craft to the selected altitude.

The present invention also contemplates accurately maintaining the altitude at which the plane is flying without moving dial 5 to the corresponding altitude. This is accomplished by an altitude control 153 including an inductive device 155 having a single phase rotor 157 connected to source S and a single phase stator 159 connected electrically through contact 160 of relay 145 to input transformer 87 of data smoothing network 47. Rotor 157 is yieldingly maintained in a predetermined position relative to the stator so that the axis of the rotor is parallel to the field of the stator and no signal is induced in the rotor in this position by the stator.

Rotor 157 is drivingly connected through gearing 161, 163, and an electromagnetic clutch 165 to an aneroid barometer 167 having a diaphragm 169 operatively connected through an arm 171 to a sector gear 173 meshing with gearing 163. With clutch 165 engaged, aneroid barometer 167 rotates rotor 157 from null position with change of altitude of the craft to provide a signal corresponding in phase and amplitude to the change in altitude at the time clutch 165 drivingly connects rotor 157 to aneroid barometer 167. Clutch 165 is moved to driving position by a solenoid 175 controlled by a switch 177 connected to the direct current source.

If the craft is flown manually and it is desired to accurately maintain the craft at the altitude at which it is flying, switch 177 is closed to drivingly engage clutch 165 and switch 147 is moved to automatic position, whereupon winding 151 of relay 145 is energized and contact 143 is opened and contact 160 is closed to connect rotor 157 to the input of data smoothing network 47. Aneroid barometer 167 responds to changes in altitude and rotates rotor 157 relative to its stator to provide an error signal when the craft departs from the selected altitude. Altitude control 153 accurately maintains the craft at the altitude at which the craft is flying even though the actual altitude may be unknown to the pilot.

The novel altitude control device hereof, when used with an automatic pilot, automatically brings the craft to a preselected altitude and accurately maintains the craft at the selected altitude. The altitude at which the craft is flying may be changed manually and the craft will automatically continue to fly at the altitude at which the craft is flying.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In an altitude control device for aircraft adapted for use with an automatic pilot, means responsive to altitude and adjustable to a preselected altitude at which the craft is to fly for providing signals for the automatic pilot when the craft is at an altitude which varies substantially from the preselected altitude to bring the craft approximately to the selected altitude, and means responsive to altitude and adjustable to said preselected altitude for providing signals for the automatic pilot when the craft is flying approximately at the selected altitude to bring the craft accurately to said altitude and to maintain the craft at said altitude, said last mentioned means comprising electrically connected transmitter and follow-up devices, one of said devices being adjustable to the preselected altitude and said other device being responsive to altitude.

2. In an altitude control device for aircraft adapted for use with an automatic pilot, means for preselecting an altitude at which the craft is to fly, means responsive to altitude and adjustable by said preselecting means for providing signals for the automatic pilot when the craft is at an altitude which varies substantially from the preselected altitude to bring the craft approximately to the selected altitude, and means responsive to altitude and including an inductive device adjustable by said preselecting means for providing signals for the automatic pilot when the craft is flying approximately at the preselected altitude to bring the craft accurately to the selected altitude and to maintain the craft at said altitude.

3. In an altitude control device for aircraft adapted for use with an automatic pilot, altitude responsive means adjustable to a preselected altitude at which the craft is to fly and providing for the automatic pilot signals of constant amplitude to bring the craft approximately to the selected altitude, and altitude responsive means providing for the automatic pilot when the craft is flying approximately at the selected altitude signals varying in amplitude with displacement of the craft from the selected altitude to bring the craft accurately to, and maintain the craft at, said altitude, said last mentioned means comprising electrically connected transmitter and follow-up devices, one of said devices being adjustable to the preselected altitude and the other of said devices being responsive to altitude.

4. In an altitude control device for aircraft adapted for use with an automatic pilot, altitude responsive means adjustable to a preselected altitude at which the craft is to fly and providing signals for the automatic pilot to bring the craft approximately to the selected altitude, altitude responsive means providing signals for the automatic pilot when the craft is flying approximately at the selected altitude to bring the craft accurately to the selected altitude and to maintain the craft at said altitude, and a data smoothing network for connecting the automatic pilot sequentially to said signal means and including a filter circuit for integrating the signal.

5. In an altitude control device for aircraft adapted for use with an automatic pilot, altitude responsive means adjustable to a preselected altitude at which the craft is to fly and providing signals for the automatic pilot to bring the craft approximately to the selected altitude, altitude responsive means providing signals for the automatic pilot when the craft is flying approximately at the selected altitude for bringing the craft accurately to said altitude and for maintaining the craft at said altitude, and a data smoothing network for connecting the automatic pilot sequentially to said signal means, said network including a filter circuit for integrating the signal and a rate circuit for advancing the phase of the integrated signal.

6. In an altitude control device for aircraft adapted for use with an automatic pilot, altitude responsive means adjustable to a preselected altitude at which the craft is to fly and providing signals for the automatic pilot to bring the craft approximately to the selected altitude, altitude responsive means providing signals for the automatic pilot when the craft is flying approximately at the selected altitude for bringing the craft accurately to said altitude and for maintaining the craft at said altitude, and a data smoothing network for connecting the automatic pilot sequentially to said signal means, said network including a filter circuit having a time delay device with a predetermined time constant for integrating the signal, and a rate circuit with a time delay device having a time constant greater than the predetermined time constant for advancing the phase of the integrated signal.

7. In an altitude control device for aircraft adapted for use with an automatic pilot, altitude responsive means adjustable to a preselected altitude at which the craft is to fly and providing signals for the automatic pilot to bring the craft approximately to the selected altitude, altitude responsive means providing signals for the automatic pilot when the craft is flying at the selected altitude to bring the craft accurately to said altitude and to maintain the craft at said altitude, a data smoothing network including filter and rate circuits connecting the automatic pilot to said signal means, and switching means for sequentially connecting said signal means to said data smoothing circuit.

8. In an altitude control device for aircraft adapted for use with an automatic pilot, altitude responsive means adjustable to a preselected altitude at which the craft is to fly and providing signals of constant amplitude for the automatic pilot to bring the craft approximately to the selected altitude, and altitude responsive means providing for the automatic pilot when the craft is flying approximately at the selected altitude, signals varying in amplitude with displacement of the craft from the selected altitude to bring the craft accurately to, and to maintain the craft accurately at, said altitude, and a data smoothing network adapted to sequentially connect the automatic pilot to said signal means and including filter and rate circuits to smooth out differences in amplitude between the signal of constant amplitude and the signal of varying amplitude when control of the craft is transferred from one signal means to the other.

9. In an altitude control device for aircraft adapted for use with an automatic pilot, altitude responsive means adjustable to a preselected altitude at which the craft is to fly and providing signals for the automatic pilot to bring the craft approximately to the selected altitude, means comprising a transmitter device adjustable to the preselected altitude and a follow-up device responsive to altitude for providing signals for the automatic pilot when the craft is flying at the selected altitude to bring the craft accurately to the selected altitude and to maintain the craft at said altitude, altitude responsive means comprising an inductive device yieldably maintained in null position, altitude sensitive means, and means for operatively connecting said inductive device to said altitude sensitive means for providing signals for the automatic pilot for automatically maintaining the craft at the altitude at which the craft is flying irrespective of the setting of said adjustable means, and switching means for controlling the automatic pilot selectively by said altitude responsive means.

10. In an altitude control device for aircraft adapted for use with an automatic pilot, adjustable means for preselecting an altitude at which the craft is to fly, a signal source of fixed amplitude, altitude sensitive means, switching means operated by said adjustable means and by said altitude sensitive means for connecting said signal source to the automatic pilot to bring the craft approximately to the selected altitude, and means responsive to altitude and comprising transmitter and follow-up devices providing signals for the automatic pilot when the craft has approximately attained the selected altitude, said transmitter device being adjustable to the preselected altitude and said follow-up device being responsive to altitude, the signals of said last-mentioned means varying in amplitude with displacement of the craft from the selected altitude and bringing the craft accurately to, and maintaining the craft at, said altitude.

11. In an altitude control device for aircraft adapted for use with an automatic pilot, adjustable means for preselecting an altitude at which the craft is to fly, altitude sensitive means, an inductive transmitter controlled by said adjustable means, an inductive receiver controlled by said altitude sensitive means and cooperating with said transmitter to provide signals varying in amplitude with displacement of the craft from the selected altitude and varying in phase with the direction of displacement of the craft relative to the selected altitude, a signal source of constant amplitude and of opposite phases, switching means controlled jointly by said adjustable means and by said altitude sensitive means for selectively connecting to the automatic pilot said inductive receiver and one of the phases of said constant amplitude source as determined by the altitude of the craft relative to the selected altitude.

12. In an altitude control device for aircraft adapted for use with an automatic pilot, adjustable means for preselecting an altitude at which the craft is to fly, altitude sensitive means, an inductive transmitter controlled by said adjustable means, an inductive receiver controlled by said altitude sensitive means and cooperating with said transmitter to provide signals varying in amplitude with displacement of the craft from the selected altitude and varying in phase with the direction of displacement of the craft relative to the selected altitude, a signal source of constant amplitude and of opposite phases, switching means controlled jointly by said adjustable means and by said altitude sensitive means for selectively connecting to the automatic pilot said inductive receiver and one of the phases of said constant amplitude source as determined by the altitude of the craft relative to the selected altitude, and means to provide signals for the automatic pilot to automatically maintain the craft at the altitude at which the craft is flying irrespective of the setting of said adjustable means, said last-mentioned signal means comprising an inductive device yieldingly maintained in null position, and means for operatively connecting said inductive device to said altitude sensitive means.

13. In an altitude control device for aircraft adapted for use with an automatic pilot, adjustable means for preselecting an altitude at which the craft is to fly, altitude sensitive means, an inductive transmitter controlled by said adjustable means, an inductive receiver controlled by said altitude sensitive means and cooperating with said transmitter to provide signals corresponding to the displacement of the craft from the selected altitude, a constant signal source, means controlled jointly by said adjustable means and by said altitude sensitive means for connecting to the automatic pilot said signal source to bring the craft approximately to the selected altitude and, when the craft is flying at said altitude, connecting to the automatic pilot said inductive receiver to bring the craft accurately to said altitude and to maintain the craft at said altitude.

14. In an altitude control device for aircraft adapted for use with an automatic pilot, adjustable means for preselecting an altitude at which the craft is to fly, altitude sensitive means, an inductive transmitter controlled by said adjustable means, an inductive receiver controlled by said altitude sensitive means and cooperating with said transmitter to provide signals varying in amplitude with displacement of the craft from the selected altitude and varying in phase with the direction of displacement of the craft relative to the selected altitude, a signal source of constant amplitude and of opposite phases, switching means controlled jointly by said adjustable means and by said altitude sensitive means for connecting to the automatic pilot one of the phases of said signal source to bring the craft approximately to the selected altitude and, when the craft is flying at said altitude, connecting to the automatic pilot said inductive receiver to bring the craft accurately to said altitude and to maintain the craft at said altitude, and a data smoothing network adapted to be connected to the automatic pilot and connected to said switching means to smooth out differences in amplitude between the signal of constant amplitude and the signal of varying amplitude when control of the craft is transferred from the signal source to said inductive transmitter and receiver.

15. In an altitude control device for aircraft adapted for use with an automatic pilot, first contact means, means for moving said contact means to a position corresponding to a selected altitude, second contact means engageable with said first contact means, altitude sensitive means operatively connected through a lost motion device to said second contact means, a signal source controlled by said contact means, a transmitter inductive device operatively connected to said contact moving means, a receiver inductive device electrically connected to said transmitter inductive device and responsive to said altitude sensitive means to provide an error signal, and switching means controlled by said contact means for connecting said source to the automatic pilot for controlling the craft by the signal from said source to bring the craft approximately to the selected altitude, and, when the craft is flying approximately at the selected altitude, for connecting said devices to the automatic pilot for controlling the craft by the error signal to accurately bring the craft to, and maintain the craft at, the selected altitude.

References Cited in the file of this patent

UNITED STATES PATENTS

| Number | Name | Date |
| --- | --- | --- |
| 1,985,982 | Edwards | Jan. 1, 1935 |
| 2,410,502 | Hurley | Nov. 5, 1946 |
| 2,415,429 | Kellogg, 2nd, et al. | Feb. 11, 1947 |
| 2,458,784 | Kettering et al. | Jan. 11, 1949 |
| 2,474,618 | Divoll | June 28, 1949 |
| 2,499,349 | Ayres | Mar. 7, 1950 |
| 2,593,014 | Divoll | Apr. 15, 1952 |